Dec. 10, 1957   E. J. BIGELOW   2,815,921
SURGE-FREE VALVE
Filed Aug. 10, 1953

INVENTOR.
EDWARD J. BIGELOW
BY
William L. Lane
ATTORNEY

United States Patent Office 2,815,921
Patented Dec. 10, 1957

2,815,921

SURGE-FREE VALVE

Edward J. Bigelow, Torrance, Calif., assignor to North American Aviation, Inc.

Application August 10, 1953, Serial No. 373,337

5 Claims. (Cl. 251—38)

This invention pertains to a valve and more particularly to a valve which will cause practically no surge in a hydraulic system with which it is associated.

A severe problem has been encountered in certain hydraulic systems from the amount of surge which occurs when a valve in the system is opened. This surge is particularly prevalent where a quick opening valve of large port area is required. In a relatively rigid system, surge pressures up to 200 percent of the system pressure are easily obtained. When it is considered that in present day aircraft hydraulic systems the working pressure may run in the neighborhood of 3,000 p. s. i., the magnitude of the problem can be readily appreciated. This surging occurs because the kinetic energy of the fluid is rapidly changed to potential energy when it meets the resistance of the hydraulic system. It is possible to minimize the rate of energy transformation by providing a relatively slow opening valve. However, this defeats the purpose and the requirements of the valves in many systems where an efficient quick opening of the valve is necessary.

Therefore, it is an object of this invention to provide a quick opening, highly efficient, surge-free valve.

Another object of this invention is to provide a valve having parallel flow paths.

A further object of this invention is to provide a valve which opens in more than one stage.

An additional object of this invention is to provide a valve which slows down the rate of energy transformation of the hydraulic fluid, yet is highly efficient and fast in its action.

These and other objects will become apparent from the following detailed description taken in connection with the accompanying drawings, in which—

Figure 1:
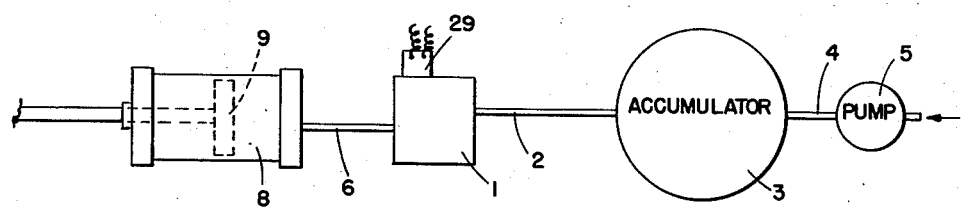
Figure 2:
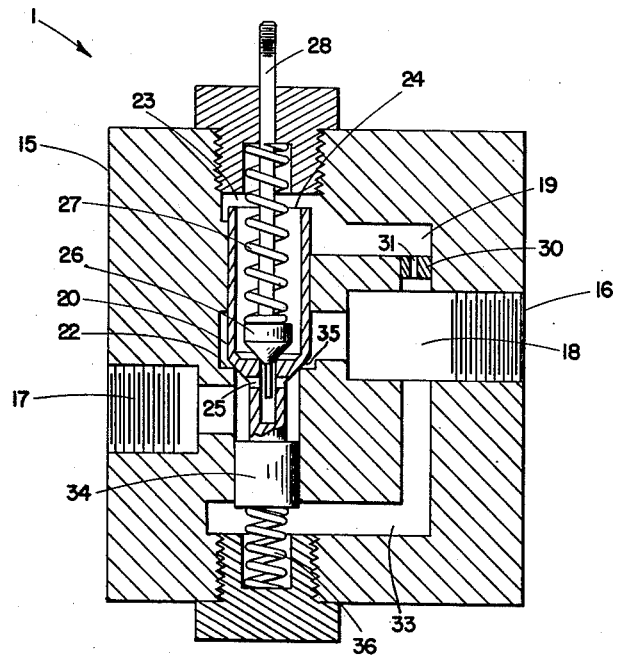

Fig. 1 is a schematic view illustrating a hydraulic system utilizing the valve of this invention; and Fig. 2 is a sectional view of a surge-free, quick-opening, two-way valve.

Referring to Fig. 1 of the drawing there is shown a hydraulic system of a type which may utilize the valve of this invention. Of course other systems of various types and complexities are possible, but the one illustrated in Fig. 1 will serve for purposes of example and illustration. As shown, the inlet of valve 1 of this invention is connected by line 2 to an accumulator 3 which in turn is connected through line 4 to pump 5. Line 6 from the valve on the low pressure side conducts fluid to a hydraulic cylinder 8 in which a piston 9 is reciprocal. It is obvious that if valve 1 is opened pressurized hydraulic fluid through line 6 will enter cylinder 8 and move the piston. It may be assumed that this system is one requiring a high initial flow from the valve, and thus an efficient rapid opening of the valve and a large port area.

The detailed construction of a valve embodying the principals of this invention can be seen in sectional view of Fig. 2. As illustrated in the drawing, the valve is provided with a body 15 which has an inlet port 16 and an outlet port 17. Within the valve body parallel flow passages 18 and 19 are provided between the inlet and outlet ports. Passage 18 is the bigger of the two, being the main flow passage for the valve. Within passage 18 is a large valve member 20, which in the embodiment shown is a poppet which seats at 22 to close off the flow through passageway 18.

Passage 19 communicates with one end of poppet 20 within chamber 23 of this passage so that the force of pressurized fluid from inlet port 16 against end portion 24 of this member will urge valve 20 into engagement with seat 22, thus biasing the valve to a closed position. An additional relatively small passage 25 is provided through the interior of valve 20 and forms an opening for passageway 19 to outlet port 17. A second smaller valve member 26 controls the flow through passageway 25 so that when both valves are closed there can be no fluid flow through either passageway 18 or passageway 19. A spring 27 is interposed between the bottom portion of valve 26 and the housing so that the spring serves to urge the valve toward a closed position. Actuating stem 28 of the valve projects beyond housing 15. This actuating stem may be connected to a suitable actuating means such as a solenoid 29 (see Fig. 1), whereby poppet 26 may be reciprocated between an open position and the closed position shown. Other actuating means are possible and member 26 may be even manually operable.

Also in passageway 19 between inlet port 16 and chamber 23 there is provided a restrictor means 30. This may be the fixed orifice type shown whereby a small opening 31 is provided in the passageway, or it may be a variable type restrictor if desired. Any fluid passing through passageway 19 must necessarily pass through restrictor 30.

A third fluid path 33 is provided in valve body 15, but there is no flow through this passage to the outlet port. Path 33 may be regarded as a continuation of parallel flow passageway 19. This passage communicates with end 34 of member 20 which is opposite from portion 24 which is subjected to pressure from fluid in passageway 19. Fluid in passageway 33 thus tends to move member 20 to an open position, in opposition to the pressure in chamber 23. A spring 36 is provided at end 34 of valve member 20, also tending to unseat this valve. End 34 of the valve member may be made of slightly lesser diameter than the effective area of end 24 thereof so that the valve member is slightly unbalanced, and the pressure in chamber 23 will exert a force greater than that in passage 33 for urging the valve member to a closed position. However, these areas are preferably nearly equal with the primary valve closing force coming from spring 27. This assures that valve member 20 will not be opened by back pressure on the outlet side of the valve. Spring 36 is not as strong as spring 27 and is for the purpose of overcoming any frictional forces when the main valve member is to be opened.

In the operation of valve 1 solenoid 29 (or other actuating means) is actuated so as to move valve stem 28 outwardly from the valve body. This unseats small poppet 26 so that it no longer covers passageway 25 through large valve member 20. When this occurs there will instantly be a flow of pressurized fluid through the outlet port from chamber 23 through the relatively small passageway provided when poppet 26 unseats. At this point the main fluid passageway 18 is closed, and it is this initial minute flow permitted by the smaller of the valve members which virtually eliminates any surge on the outlet side of the valve. No surge occurs from this first stage of flow, because of the high resistance to this flow from small passageway 25.

Following the opening of small valve member 26 there will be a fluid flow through passageway 19, whereby the fluid will pass through restricted opening 31 which will cause a drop in the pressure of the fluid. Thus the pressure within chamber 23 will be less than that within the inlet to the valve because the fluid in the chamber has flowed through the restricted opening. This means that the pressure within passage 33 will then be great enough to overcome the reduced force exerted on end 24 of poppet 20 so that the pressure exerted against end 34 thereof will unseat the large poppet and provide a low resistance flow path through main fluid passageway 18. Fluid pressure on under surface 35 of poppet 20 will also assist in opening this valve member. By the time this main fluid flow has occurred the pressure within the system on the outlet side of the valve will have been increased due to the initial flow of the small quantity of fluid from chamber 23 through passageway 25. As a result, when the flow through the main passageway encounters the hydraulic system on the outlet of the valve, practically all tendency to surge will have been eliminated. There will be no sudden transformation of energy from kinetic to potential when the main fluid valve is opened because the outlet pressure is then more closely approximating that of the inlet pressure. When valve member 20 is opened there is a low resistance path for the fluid so that there is little pressure drop through the valve despite its surge-free characteristics. It has been found that the initial flow through the restricted passageway, which is governed by a small valve member, need be only a minute amount while nevertheless all but eliminating outlet surge. It has also been discovered that the small valve need open only a fraction of a second before the main valve opens in order that the surging may be prevented. For this reason the opening of the low resistance main fluid passageway can, for all practical purposes, be regarded as instantaneous, yet by being preceded by a restricted opening of a parallel flow passageway, surging is reduced from a high value to practically zero. Furthermore, in the embodiment illustrated, an improved method is provided for opening the main valve by means of a restrictor which decreases the pressure on one side of this valve so that the fluid itself can cause the opening of this main valve.

Closing of valve 1 is easily effected by forcing both poppets against their seats by means of stem 28 of the smaller poppet. Return of this stem by solenoid 29, or other actuating means, returns both poppets to the position of Fig. 2.

It is, of course, not necessary that the valve utilize poppet valves as illustrated, because slide valves, or a combination of slide and poppet valves, could be made to operate with equal facility and by the same principles. Furthermore, the basic idea of a valve with parallel flow passageways, one of which provides a restricted initial flow, can be applied to various types of valves other than the shut-off type valve of Fig. 2.

It can be seen, therefore, that I have provided a valve which effectively reduces surge to a minimum value, yet which is highly efficient and rapid in its action. The principle of the parallel flow passages, with the restricted passage providing for initial outlet, can be applied to valves intended for various purposes. Furthermore, I have provided a novel means for opening a valve whereby the flow through the restricted passageway causes a pressure drop enabling the main fluid pressure to open the main fluid passageway.

The foregoing detailed description is to be clearly understood as given by way of illustration and example only, the spirit and scope of this invention being limited only by the appended claims.

I claim:

1. A surge-free valve for high pressure hydraulic systems comprising a fluid conducting means having an inlet and an outlet interconnected by a main fluid passage means, a first valve in said main fluid passage means for controlling fluid flow therethrough, said first valve being movable between an open and a closed position independently of pressure in said outlet, a second and restricted passage means interconnecting said inlet and said outlet, said second passage means communicating with said first valve so that fluid therein imposes a closing force thereon, a second valve in said second passage means for controlling the fluid flow therethrough, means for opening said second valve, and means for opening said first valve including pressure means connected to said inlet and remote from said main fluid passageway for applying a fluid force from said inlet against said first valve sufficient to open the same when said second valve has been previously opened.

2. A surge-free valve comprising housing means, a main fluid passageway in said housing means interconnecting a fluid inlet and a fluid outlet for said housing, a restricted by-pass in said housing interconnecting said inlet and said outlet, a first valve in said main fluid passage means for controlling the fluid flow therethrough, said first valve being balanced with respect to pressure in said outlet, said by-pass communicating with said first valve means so that fluid therein imposes a closing force thereon, a second valve in said by-pass for controlling fluid therethrough, means exteriorly of said housing for opening said second valve, and fluid pressure means connected with said inlet, remote from said main passageway and communicating with portions of said main valve remote from said main passageway for exerting a fluid force thereagainst sufficient to open the same upon prior opening of said second valve.

3. A surge-free valve comprising a housing, a main fluid passageway in said housing interconnecting a fluid inlet and a fluid outlet, a restricted by-pass in said housing interconnecting said inlet and said outlet, a first valve member in said main fluid passage for controlling the fluid flow therethrough, said first valve member having opposed faces in said outlet for neutralizing forces thereon from pressure in said outlet, a pressure chamber in said housing communicating with said inlet, said first valve member having a face communicating therewith such that fluid pressure therein biases said first valve to an open position, a second valve member in said by-pass for controlling the fluid flow therethrough, said first valve member having a face communicating with said by-pass such that fluid pressure in said by-pass biases said first valve member to a closed position, and means for opening said second valve member for permitting fluid to flow through said by-pass for thereby lowering the pressure on the face of said first valve member communicating therewith whereby the pressure on the face of said first valve member in said pressure chamber causes said first valve member to open.

4. A surge-free valve assembly comprising a body member having inlet and an outlet adapted for connection in a fluid transmitting line, fluid passage means in said body interconnecting said inlet and said outlet, a first valve means in said passage means for controlling the flow therethrough, said first valve means having opposed faces communicating with said outlet for balancing said first valve means with respect to pressure in said outlet, a pressure chamber in said body connected to said inlet and communicating with portions of said first valve means remote from said fluid passage means for urging said first valve means to an open position, said first valve means having a fluid port therethrough communicating with said outlet, a restricted fluid by-pass connecting said inlet and said fluid port, a second valve means in said fluid port for controlling the fluid flow therethrough, said first valve means having a portion thereof in said by-pass providing a pressure area against which fluid in said by-pass acts to urge said first valve to a closed position, and means operable exteriorly of said body for opening said second valve means for permitting restricted fluid flow through said by-pass and said first valve means to said outlet for causing a pressure drop in said by-pass and permitting fluid pressure in said pressure chamber to move said first valve means to an open position.

5. A surge-free valve comprising a housing having an inlet and an outlet for connection in a fluid transmitting line, a main fluid passage in said housing interconnecting said inlet and said outlet, a first poppet in said main fluid passage for controlling the flow therethrough, said main fluid passage having a seat for engagement by said poppet such that the underside of said poppet is in communication with said outlet, a pressure chamber in said housing connected to said inlet for receiving pressurized fluid therefrom, said first poppet having piston means having a face communicating with said pressure chamber arranged to receive a reaction from fluid therein biasing said first poppet to an open position, said piston means additionally having a face communicating with said outlet such that fluid pressure in said outlet reacts thereagainst to bias said poppet to a closed position and balance fluid forces on said underside of said poppet, said housing having a restricted by-pass therein communicating with the upper surface of said first poppet, said first poppet having a passage therein interconnecting said by-pass and said outlet, a second poppet in said passage in said first poppet for controlling the flow therethrough, and means operable exteriorly of said housing for opening said second poppet thereby permitting restricted flow through said by-pass to said outlet lowering the pressure on said upper side of said first poppet for permitting fluid in said pressure chamber to open said first poppet.

References Cited in the file of this patent

UNITED STATES PATENTS

| | | |
|---|---|---|
| 616,197 | Moller | Dec. 20, 1898 |
| 882,798 | Reid | Mar. 24, 1908 |
| 1,882,392 | Musgrave | Oct. 11, 1932 |
| 2,544,016 | Getz | Mar. 6, 1951 |
| 2,574,488 | Langdon | Nov. 13, 1951 |
| 2,604,905 | Myer | July 29, 1952 |
| 2,624,542 | Ghormley | Jan. 6, 1953 |
| 2,674,326 | Siebens | Apr. 6, 1954 |
| 2,708,092 | Smith | May 10, 1955 |

FOREIGN PATENTS

| | | |
|---|---|---|
| 23,792 | Great Britain | 1898 |